July 16, 1940.  C. M. ASHLEY  2,208,443
AIR CONDITIONING METHOD AND APPARATUS
Filed April 6, 1938
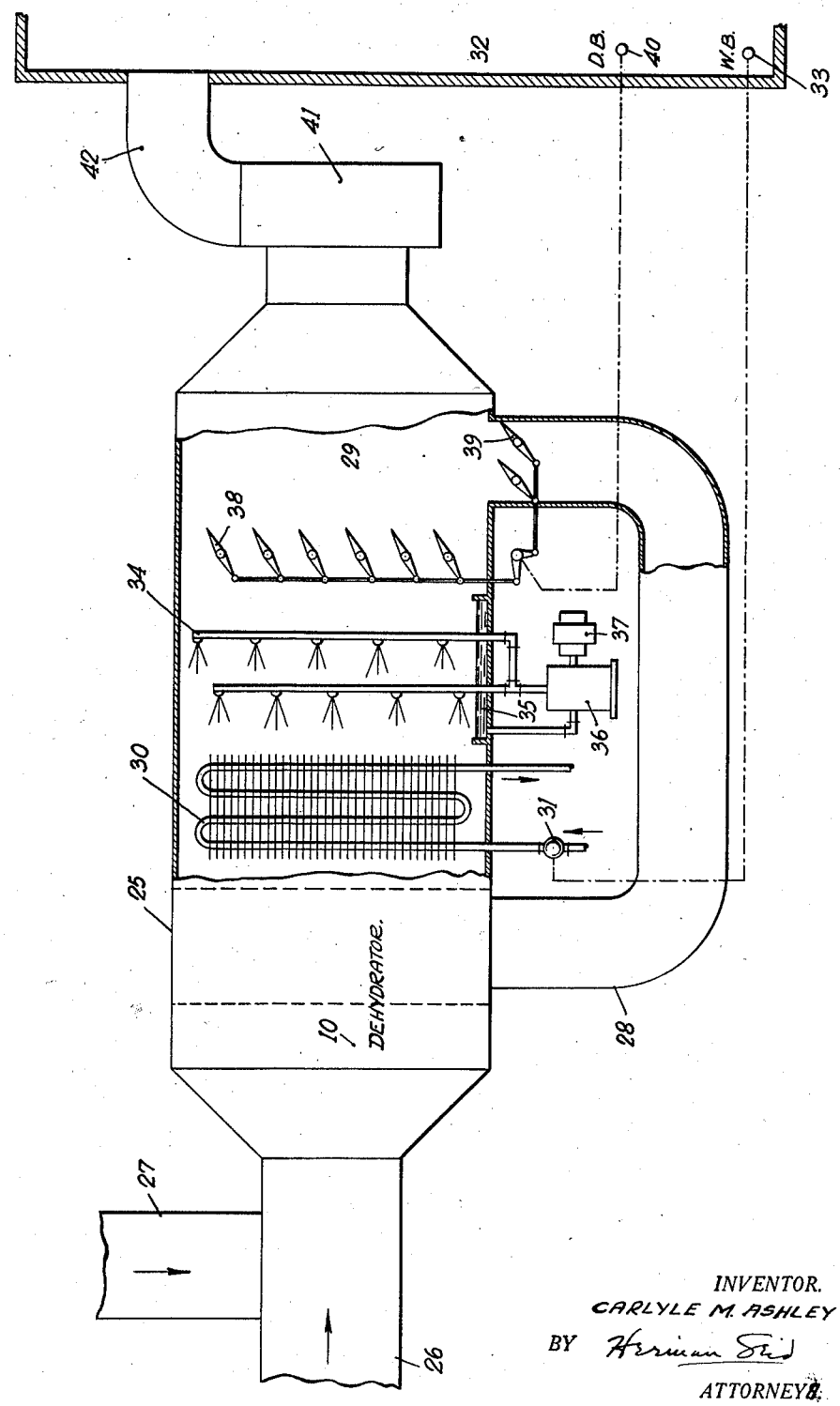
INVENTOR.
CARLYLE M. ASHLEY
BY
ATTORNEYS.

Patented July 16, 1940

2,208,443

UNITED STATES PATENT OFFICE 2,208,443

AIR CONDITIONING METHOD AND APPARATUS

Carlyle M. Ashley, Syracuse, N. Y., assignor to Carrier Corporation, Syracuse, N. Y., a corporation of Delaware Application April 6, 1938, Serial No. 200,498

9 Claims. (Cl. 236—44)

This invention relates to air conditioning.

The general object of the invention is to provide an improved method of and apparatus for air conditioning enclosures.

In air conditioning enclosures it is necessary not only to control the dry bulb temperature of the air but also to maintain the moisture content thereof within a predetermined range. Under many operating conditions the maintenance of the moisture content of the air between desired limits necessitates the removal of moisture from air being conditioned for supply to the conditioned enclosure. Such moisture removal may be effected, broadly, in either of two ways: dehumidification and dehydration. Dehumidification of the air is accomplished by cooling the air below its dewpoint whereby to precipitate moisture therefrom. This method of reducing the moisture content of the air has the disadvantage that the cooling process and the moisture reduction process are integrally related results of the same operation, which fact presents certain control difficulties. A further disadvantage of effecting moisture reduction by dehumidification, is that the air thus dehumidified generally must be reheated to a substantial degree in order that it may be suitable for supply to a conditioned enclosure. Reduction of the moisture content of air by dehydration possesses neither of these disadvantages of the dehumidifying process. When air is dehydrated, the reduction of the moisture content and the regulation of the dry bulb temperature may be accomplished independently and under separate control. Further, there is no necessity for reheating dehydrated air, since the dehydration process tends to raise the dry bulb temperature by release of the latent heat of vaporization of the moisture removed from the air. Furthermore, dehumidification usually requires the use of a relatively great amount of artificial refrigeration in order to maintain the dewpoint of the conditioned air at a sufficiently low value. However, when dehydration is employed for controlling the moisture content of conditioned air, much less artificial refrigeration is required, and very frequently this may be dispensed with entirely.

It is an object of the present invention to provide an improved method of and apparatus for conditioning air in which the temperature and humidity of the air are separately controlled, and in which the moisture content of the air being conditioned is reduced by dehydration.

It is another object of the invention to provide an improved method of and apparatus for conditioning air in which a plurality of streams of air having different conditions are mixed to provide a final mixture having desired characteristics of temperature and humidity, at least one of said streams of air being bypassed around conditioning steps to which another of said streams is subjected.

A feature of the invention resides in dehydrating a volume of air and dividing the dehydrated air into two portions, reducing the wet bulb and dry bulb temperatures of one of said portions and then further reducing the dry bulb temperature of said portion, reuniting said portion with the other portion of the dehydrated air which is bypassed around the cooling steps, and supplying the resultant mixture to an enclosure to be conditioned.

Another feature of the invention resides in dehydrating a volume of air, dividing the dehydrated air into two portions, subjecting one of said portions to indirect heat exchange with a cooling medium whereby to reduce the dry bulb and wet bulb temperatures of said portion, further reducing the dry bulb temperature of said portion by adiabatic evaporation of moisture into said portion, and supplying to the enclosure to be conditioned both portions of said air.

Another feature of the invention resides in dehydrating a volume of air, dividing the dehydrated air into two portions, subjecting one of said portions to indirect heat exchange with a cooling medium whereby to reduce the dry bulb and wet bulb temperatures of said portion, further reducing the dry bulb temperature of said portion by adiabatic evaporation of moisture into portion, supplying to the enclosure to be conditioned both portions of said air, and controlling the volumetric ratio in which air of said first portion and air of said other portion are supplied to said enclosure.

Other objects and features of the invention will be more apparent from the following description to be read in connection with the accompanying drawing, in which The figure diagrammatically illustrates an embodiment of the invention.

In the drawing, conditioner casing 25 is adapted to receive fresh air through inlet duct 26 and, if desired, return air from the conditioned enclosure through the duct 27. Suitable dampers may be provided for controlling the proportions of outdoor and/or return air supplied to the conditioner casing 25. Casing 25 is provided with a dehydrator 10. The dehydrator may be of any well known type and may utilize either a liquid absorber such as lithium chloride or a solid adsorber such as silica gel. Since the dehydrator does not, per se, form a part of the invention, and since various types of such apparatus are well known and understood by those skilled in the art, no further description of the dehydrator 10 is deemed required here. It is to be understood that suitable provision is made for the regeneration of the dehydrating agent in accordance with conventional practice, and also, that the dehydrator is controlled in any well known manner to regulate desirably the moisture content of the air delivered from the dehydrator 10. The conditioner casing 25 is provided with a bypass conduit 28 through which air dehydrated in dehydrator 10 may be bypassed to mixing chamber 29 at the outlet end of the conditioner casing. Fan 41 draws air from mixing chamber 29 and supplies it through duct 42 to conditioned enclosure 32. Within the main body of the conditioner casing there is provided a cooling coil 30 for abstracting heat from that portion of the dehydrated air which is not bypassed through duct 28. The cooling action of coil 30 may be controlled in any suitable manner as by providing a valve 31 controlling the supply of cooling medium to the coil. Preferably, control of the cooling action is effected in accordance with variations in the wet bulb temperature in the conditioned enclosure 32, as reflected by wet bulb thermostat or hygrostat 33 which may control the operation of valve 31.

The circulation of cooling medium through coils 30 reduces the dry bulb temperature of the dehydrated air. Since there is an abstraction of heat from the dehydrated air, there is also a reduction in the wet bulb temperature of the air, as is well understood. Accordingly, the air which passes from the coiling coil 30 has a wet bulb temperature which is lower than that of the dehydrated air prior to cooling. The portion of the air circulated through the main conditioner casing is then subjected to a further conditioning step in which the dry bulb temperature of the air is lowered, preferably without affecting the wet bulb temperature or total heat content of the air. This is accomplished by subjecting the air to the action of water particles discharged from spray headers 34. In accordance with familiar principles, the air thus sprayed with water absorbs a portion of the sprayed moisture, and its dry bulb temperature is reduced in accordance with the degree to which the air becomes saturated with moisture, the air tending to become saturated at its reduced wet bulb temperature. Excess spray water is collected in sump 35 from which it is drained to pump 36, driven by motor 37, pump 36 serving to recirculate this water to the spray headers 34. Any suitable means may be provided for supplying make-up water to compensate for the evaporation of moisture into the circulated air. Also, if desired, suitable eliminators of any desired type may be employed to prevent entrainment of water particles by the air stream.

Due to the reduction of the wet bulb temperature of the air circulated through the casing 25 and due to the subsequent reduction of its dry bulb temperature, the air thus conditioned has a very low dry bulb temperature, although its relative humidity may be relatively high due to the action of the spray headers. On the other hand, the air circulated through the bypass duct 28 has a relatively high dry bulb temperature and a very low relative humidity. By mixing these streams of air and by suitably regulating the cooling action of coils 30, there may be produced a final mixture having desired characteristics of both temperature and humidity. Accordingly, there are provided dampers 38 for controlling the flow of air through the main portion of the conditioner casing 25 and dampers 39 for controlling the flow of air through the bypass duct 28. Dampers 38 and 39 are preferably differentially connected so that as one set of dampers opens more widely, the other correspondingly closes and vice-versa. These dampers control the relative proportions of air drawn through the casing section 25 and through the bypass duct 28. The dampers 38 and 39 are preferably controlled in accordance with changes in the atmospheric conditions in the conditioned enclosure, as reflected for example, by dry bulb thermostat 40, which controls the adjustment of the dampers. When the dry bulb temperature in the enclosure is too low, the dampers 38 are closed somewhat and the dampers 39 correspondingly opened wider; and when the dry bulb temperature in the enclosure is too high, the dampers 38 are opened more widely and the dampers 39 are closed to a corresponding degree. When the wet bulb temperature in the enclosure is too high, the wet bulb thermostat 33 operates to admit more cooling medium to the coil 30, and when the wet bulb temperature in the enclosure is too low, less cooling medium is supplied to the coils 30.

If desired, the cooling coils 30 may be arranged within casing 25 in such manner as to cool all of the air circulated through and delivered from dehydrator 10. This arrangement is preferable when it is desired to obtain a particularly low dry bulb temperature of the final mixture. The same result might be achieved, of course, by inserting in the system an additional cooling coil section in the bypass duct 28.

Since many changes may be made in the invention without departing from its scope, it is intended that all matter contained in the above description or shown in the accompanying drawing shall be interpreted as illustrative only and not in a limiting sense, applicant limiting himself only as indicated in the appended claims.

I claim:

1. The method of air conditioning an enclosure which consists in dehydrating a stream of air, dividing the dehydrated air stream into a plurality of portions, circulating a cooling medium in heat exchange relation with a first portion of said dehydrated air, whereby the dry bulb temperature and wet bulb temperature of said first air portion are reduced, intimately contacting said cooled first portion of the dehydrated air with liquid adapted to evaporate into said air whereby the dry bulb temperature of said first air portion is further decreased, bypassing a second portion of said dehydrated air around said temperature-reducing steps to which said first portion of the dehydrated air is subjected, and supplying both portions of the original dehydrated air stream to said enclosure.

2. The method of air conditioning an enclosure which includes the steps of dehydrating air, cooling a first portion of the dehydrated air by circulating a cooling medium in indirect heat exchange relation therewith, whereby the dry bulb and wet bulb temperatures of said portion are reduced, intimately contacting said first air portion with liquid adapted readily to evaporate into said air portion whereby to further reduce the dry bulb temperature of said portion, supplying to the enclosure the air thus conditioned, and also supplying to the enclosure another portion of the dehydrated air having a lower moisture content than said first air portion and a higher dry bulb temperature than said first air portion.

3. The method of air conditioning an enclosure which includes the steps of dehydrating air, increasing the moisture content and reducing the dry bulb temperature of a first portion of the dehydrated air, supplying to the enclosure the air thus conditioned and also supplying to the enclosure another portion of the dehydrated air having a higher dry bulb temperature and lower moisture content than said first air portion.

4. The method of air conditioning an enclosure which comprises dehydrating air, cooling a first portion of the dehydrated air by circulating a cooling medium in indirect heat exchange relation therewith, whereby the dry bulb and wet bulb temperatures of said portions are reduced, intimately contacting said air portion with liquid adapted readily to evaporate into said air portion to further reduce the dry bulb temperature of said portion, mixing with the air thus conditioned another portion of the dehydrated air having a higher dry bulb temperature and a lower moisture content than said first air portion, whereby to produce a mixture having a desired temperature and moisture content, and supplying the resultant mixture to said enclosure.

5. The method of air conditioning an enclosure which comprises dehydrating air, cooling a first portion of the dehydrated air by subjecting said first air portion to the cooling action of a cooling medium circulated in indirect heat exchange relation therewith, whereby the dry bulb and wet bulb temperatures of said portion are reduced, intimately and directly contacting said air portion with liquid adapted readily to evaporate into said air portion to further reduce the dry bulb temperature of said portion, mixing with the air thus conditioned another portion of the dehydrated air having a higher dry bulb temperature and a lower moisture content than said first air portion, whereby to produce an air mixture, supplying said mixture to said enclosure, and controlling the proportions of said different airs in said mixture in accordance with changes in a characteristic of air in said enclosure.

6. The method of air conditioning an enclosure which comprises dehydrating air, cooling a first portion of the dehydrated air by subjecting said first air portion to the cooling action of a cooling medium circulated in indirect heat exchange relation therewith, whereby the dry bulb and wet bulb temperatures of said portion are reduced, intimately and directly contacting said air portion with liquid adapted readily to evaporate into said air portion to further reduce the dry bulb temperature thereof, mixing with the air thus conditioned another portion of the dehydrated air having a higher dry bulb temperature and a lower moisture content than said first air portion, whereby to produce a mixture, supplying said mixture to said enclosure, and controlling said cooling action in accordance with changes in a characteristic of the atmosphere of said enclosure.

7. The method of air conditioning an enclosure which comprises dehydrating air, cooling a first portion of the dehydrated air by subjecting said first air portion to the cooling action of a cooling medium circulated in indirect heat exchange relation therewith, whereby the dry bulb and wet bulb temperatures of said portion are reduced, intimately and directly contacting said air portion with liquid adapted readily to evaporate into said air portion to further reduce the dry bulb temperature thereof, mixing wtih the air thus conditioned another portion of the dehydrated air having a higher dry bulb temperature and a lower moisture content than said first air portion, whereby to produce an air mixture, supplying said mixture to said enclosure, controlling the proportions of said different airs in said mixture in accordance with changes in a characteristic of air in said enclosure, and controlling the cooling of said first air portion in accordance with changes in another characteristic of the atmosphere of said enclosure.

8. In an apparatus of the character described, means for dehyrating air, means for reducing the dry bulb temperature and increasing the moisture content of a first portion of said dehydrated air, a bypass passage adapted to receive another portion of said dehydrated air, means including said bypass passage for mixing said first portion of the dehydrated air after the temperature reduction thereof with said other portion of the dehydrated air having a higher dry bulb temperature and lower moisture content than said first portion, and means for supplying the resultant mixture to an enclosure to be conditioned.

9. The method of air conditioning an enclosure which consists in dehydrating a volume of air and then subjecting the dehydrated air to heat exchange relation with a cooling medium circulated in indirect heat exchange relation therewith, intimately contacting one portion of said air thus conditioned with liquid adapted readily to evaporate into said air, and supplying to said enclosure said portion of the air and the remaining portion of said air, said remaining air portion being bypassed around the step in which said first-mentioned air portion is contacted with said liquid.

CARLYLE M. ASHLEY.